United States Patent
Hazell et al.

(10) Patent No.: US 8,326,360 B2
(45) Date of Patent: Dec. 4, 2012

(54) METHOD AND SYSTEM FOR THE CONFIGURATION OF A MOBILE STATION BASEBAND CIRCUIT FOR AN ACOUSTIC ACCESSORY

(75) Inventors: Barry Steven Hazell, Ottawa (CA); Kevin John Rush, Calgary (CA)

(73) Assignee: Research In Motion Limited, Waterloo, ON ( * ) Notice: Subject to any disclaimer, the term of this patent is extended or adjusted under 35 U.S.C. 154(b) by 0 days.

(21) Appl. No.: 13/050,564

(22) Filed: Mar. 17, 2011

(65) Prior Publication Data

US 2011/0177784 A1    Jul. 21, 2011

Related U.S. Application Data

(63) Continuation of application No. 12/641,375, filed on Dec. 18, 2009, now Pat. No. 7,917,174, which is a continuation of application No. 10/929,491, filed on Aug. 31, 2004, now Pat. No. 7,660,605.

(51) Int. Cl.
| | |
|---|---|
| H04B 7/00 | (2006.01) |
| H04B 1/38 | (2006.01) |
| H04M 1/00 | (2006.01) |
| H04R 5/02 | (2006.01) |

(52) U.S. Cl. ............ 455/557; 455/556.1; 455/41.2; 381/303; 381/311

(58) Field of Classification Search .......... 455/41.2, 455/41.3, 557, 550.1, 556.1, 556.2; 381/303, 381/311
See application file for complete search history.

(56) References Cited

U.S. PATENT DOCUMENTS

| | | | |
|---|---|---|---|
| 5,790,671 | A | 8/1998 | Cooper |
| 5,797,102 | A | 8/1998 | Hallikainen et al. |
| 5,923,761 | A | 7/1999 | Lodenius |
| 6,070,088 | A | 5/2000 | Satoh |
| 6,680,923 | B1 | 1/2004 | Leon |
| 6,928,299 | B1 | 8/2005 | Rinne et al. |
| 7,206,564 | B2 | 4/2007 | Yang et al. |
| 7,660,605 | B2 | 2/2010 | Hazell et al. |
| 2004/0125779 | A1* | 7/2004 | Kelton et al. ............... 370/338 |
| 2004/0202132 | A1 | 10/2004 | Heinonen et al. |
| 2004/0203610 | A1 | 10/2004 | Deeds |
| 2005/0096084 | A1 | 5/2005 | Pohja et al. |
| 2006/0003781 | A1 | 1/2006 | Jin et al. |

FOREIGN PATENT DOCUMENTS

| | | |
|---|---|---|
| EP | 0535838 | 4/1993 |
| EP | 0802694 B1 | 10/1997 |
| EP | 1005213 A2 | 5/2000 |
| WO | 02/095612 A1 | 11/2002 |
| WO | 02/096137 A1 | 11/2002 |

* cited by examiner

*Primary Examiner* — Andrew Wendell
(74) *Attorney, Agent, or Firm* — Moffat & Co.

(57) ABSTRACT

A method and system for the configuration of a mobile station baseband circuit for an acoustic accessory having an identifier, the method comprising the steps of: determining whether the mobile device recognizes the identifier of the acoustic device; and configuring the baseband circuit with a DSP filter response and CODEC acoustic gain parameters for the acoustic device if the mobile device recognizes the identifier of the acoustic device. The system comprising: an identifier for each of the plurality of acoustic devices; a local memory in the mobile station storing a frequency (filter) response and gain parameters for at least one of the plurality of acoustic devices and for mapping them to the identifier; and a digital signal processor to re-shape an acoustic frequency response and adjust an audio gain of a baseband circuit for the mobile station based on the stored frequency response and gain parameters.

16 Claims, 4 Drawing Sheets

FIG. 3
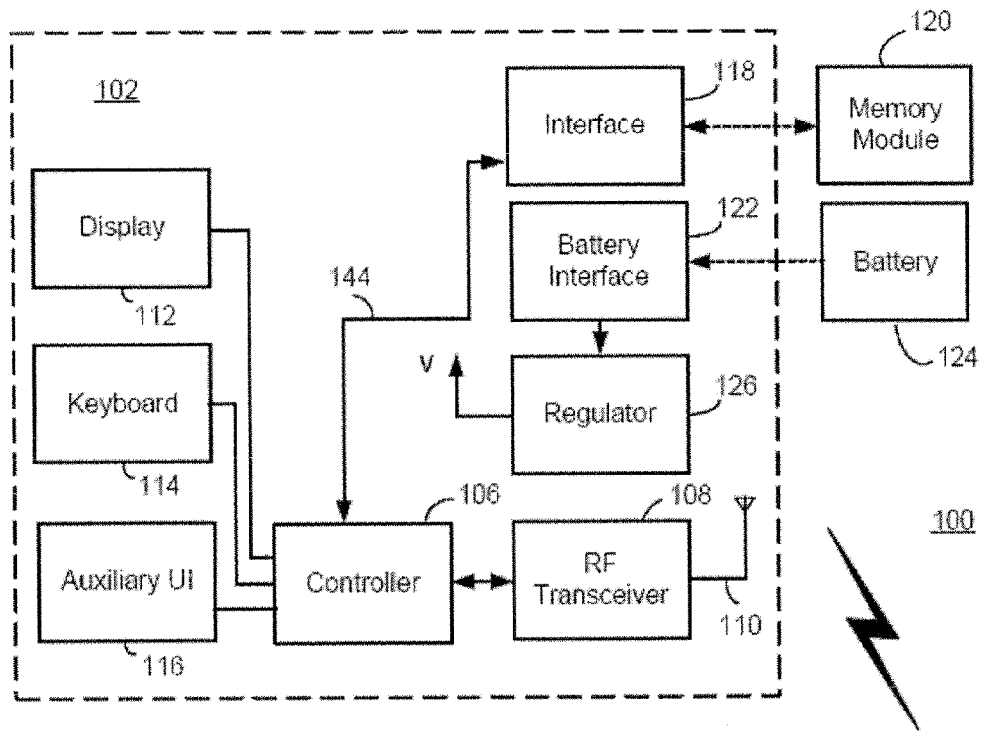
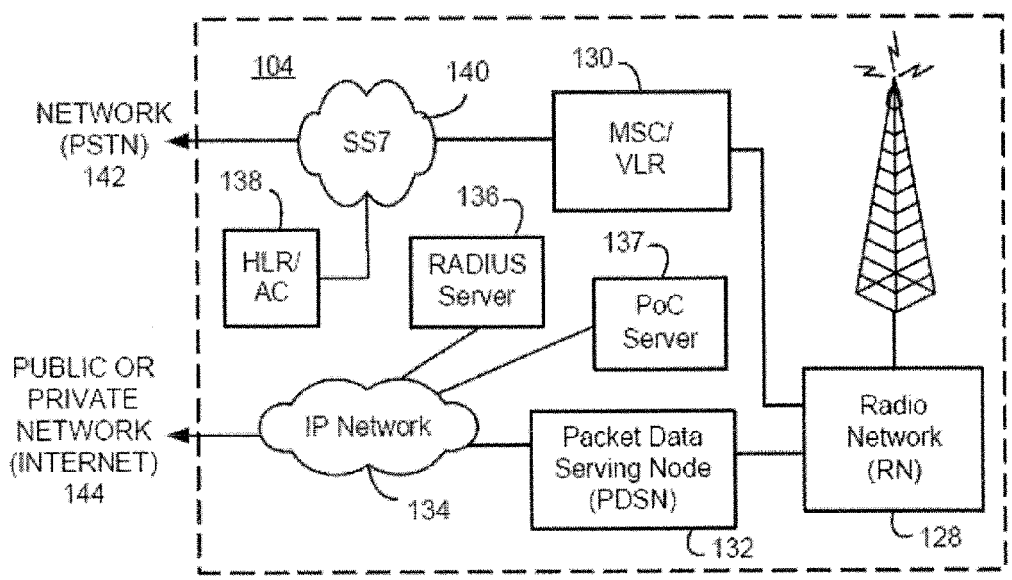

METHOD AND SYSTEM FOR THE CONFIGURATION OF A MOBILE STATION BASEBAND CIRCUIT FOR AN ACOUSTIC ACCESSORY

RELATED APPLICATIONS

The present application is a continuation of U.S. patent application Ser. No. 12/641,375, filed Dec. 18, 2009, which is a continuation of U.S. Pat. No. 7,660,605, filed Aug. 31, 2004 and issued Feb. 9, 2010, the contents of both of which are incorporated herein by reference.

FIELD OF THE TECHNOLOGY

The present system and method relates to the configuration of a mobile station baseband circuit for an acoustic accessory, and in particular to the configuration of the acoustic frequency response and audio gain parameters for a specific acoustic accessory.

BACKGROUND

Acoustic devices come in a variety of shapes and are made of various materials. This results in a different form factor for each acoustic device which will impact the acoustic characteristics of the microphone and receiver.

Such acoustic devices include wireless short-range communication devices such as Bluetooth™ devices. Bluetooth™ devices are capable of point-to-point or point-to-multipoint communications.

In present systems, a mobile station uses a generic CODEC and audio filter parameters for the acoustic device. These parameters cannot compensate for the different acoustic characteristics of all the various acoustic devices.

SUMMARY

The present system and method provides for the configuration of a mobile station based on the acoustic device being used in association with that mobile station. While various acoustic devices and communication protocols can be used, in one embodiment the acoustic device is a Bluetooth™ device. Every Bluetooth™ device has its own identification code consisting of a Bluetooth™ device address. As well, many manufacturers encode Bluetooth™ devices to transmit a Bluetooth™ device name and/or model number, providing a unique identifier for the type of device that is being used.

Accordingly, the present system and method receives the Bluetooth™ device name and/or model number, or in a different communications protocol, a unique identifier for the device, and configures the acoustic baseband circuit in the mobile station with the acoustics of the acoustic device. This will ensure the overall acoustic frequency response of mobile station and acoustic device will meet the required Telecommunications Industry Association Electro-Acoustic Standard.

In one embodiment of the present system and method, the digital signal processing (DSP) filter response and coder-decoder (CODEC) acoustic gain parameters of the mobile station for a specific acoustic device can be stored in the memory of the mobile station. In other embodiments, the DSP filter response and coder-decoder (CODEC) acoustic gain parameters can be loaded from a remote database.

The present application therefore provides a method for the configuration of a mobile station baseband circuit for an acoustic accessory having an identifier, the method comprising the steps of: determining whether the mobile device recognizes the identifier of the acoustic device; and configuring the baseband circuit with a DSP filter response and CODEC acoustic gain parameters for the acoustic device if the mobile device recognizes the identifier of the acoustic device.

The present application further provides a system for providing similar acoustic characteristics for each of a plurality of acoustic devices communicating with a mobile station, the system comprising: an identifier for each of the plurality of acoustic devices; a local memory in the mobile station storing a filter response and gain parameters for at least one of the plurality of acoustic devices and for mapping the filter response and gain parameters with the identifier of at least one of the plurality of acoustic devices; and a digital signal processor to re-shape an acoustic frequency response and adjust an audio gain of a baseband circuit for said mobile station based on the acoustic device identifier.

BRIEF DESCRIPTION OF THE DRAWINGS

The present system and method will be better understood with reference to the drawings in which:

FIG. 3 shows a block diagram of a communications system, including a mobile station upon which the present system and method can be implemented.

DETAILED DESCRIPTION OF THE DRAWINGS

The present system and method ensures that the frequency response and voice output levels for each audio accessory paired with a mobile station are equivalent and all meet the same certification acoustic mark. It is required that the mobile station therefore automatically reshapes the acoustic frequency response and adjusts the audio gain parameters in the mobile station baseband circuit for a particular acoustic accessory.

The present invention is described below with reference to a Bluetooth™ accessory and a mobile station. However, as will be appreciated by those skilled in the art, other communications protocols could be used including a wired connection or other wireless protocols. Further, one skilled in the art will appreciate that, instead of a mobile station, other hosted devices could be used. These could include, for example, a desktop computer streaming music to a remote headset accessory, a stereo system streaming music to speakers, other voice devices, the acoustic portion of a video device, or a headset/car kit for a vehicle.

Figure 1:
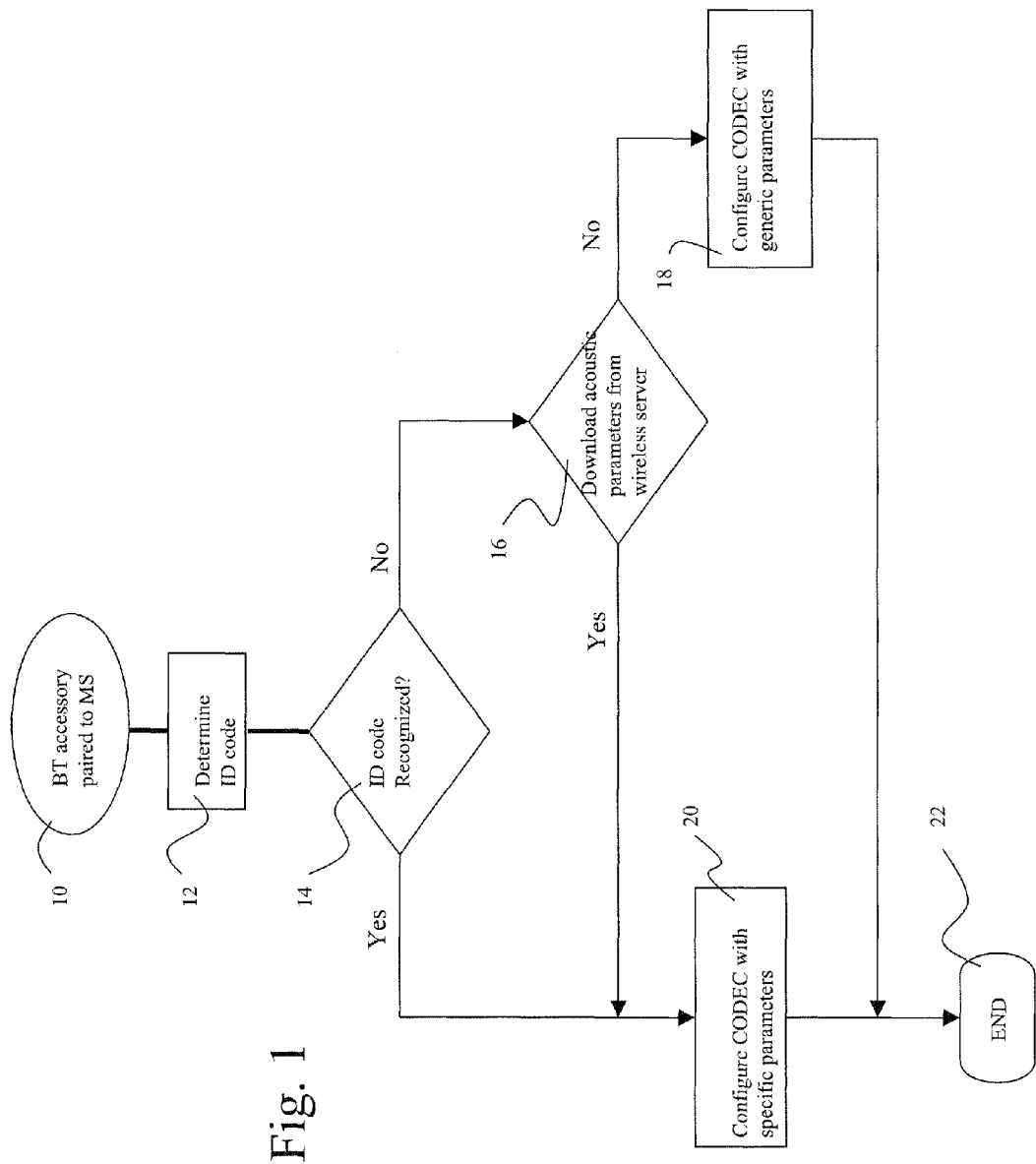
FIG. 1 is one embodiment of the present method.

Reference is now made to FIG. 1. In step 10, a mobile station determines whether a Bluetooth™ accessory is paired with the mobile station. Further, in step 10 it is determined whether the Bluetooth™ accessory is an audio or multi-media device. This can be recognized from the Bluetooth™ standard which provides identifiers to indicate the type of device.

If a Bluetooth™ audio or multimedia accessory is paired to the mobile station, the mobile station in step 12 determines an identifier for the Bluetooth™ accessory. This would generally be the model number of the accessory and would be provided to the mobile station during the handshaking between the accessory and the mobile station. Currently, it is not within the standard Bluetooth™ specification to provide a model number necessarily. However, many manufacturers are including this information voluntarily.

The mobile station next proceeds to step 14 in which it is determined whether or not the identifier found in step 12 is recognized. As will be appreciated by those skilled in the art, if the identifier is not provided by the device manufacturer, then no ID code will exist and therefore the device will not be recognized.

Step 14 only recognizes the identifier if the identifier and characteristics for the device are stored locally.

In step 14 if the identifier is not recognized, the mobile station next proceeds to step 16. In step 16 it is determined whether or not the acoustic parameters can be downloaded from a wireless server. As will be appreciated by those skilled in the art, this step can only occur if using a mobile station that is connected to a communications network. If the present system is implemented on a device without communications capabilities, this step will not exist and the system will need to proceed directly to step 18 as described below.

If, in step 16, it is found to not be possible to download the acoustic parameters from a wireless server, then the mobile station proceeds to step 18 in which a DSP filter response and CODEC acoustic gain parameters are set for a generic device. This is the default setting in case the acoustic device does not provide an identifier, does not have a frequency response DSP filter or CODEC acoustic gain parameter within a database or stored in the memory of the mobile station or the host device does not have communication capability.

If, in step 14, the identifier is recognized and stored in local memory, or if in step 16 the acoustic parameters can be downloaded from a wireless server, the mobile station proceeds to step 20. In step 20 the DSP filter response of the mobile station is configured for the specific Bluetooth™ accessory based on the ID code. Also, the CODEC acoustic gain parameters of the mobile station are configured for the specific Bluetooth™ accessory based on the identifier.

Step 16 preferably allows the mobile station to access a remote database that contains a list of acoustic devices and the acoustic DSP filter response and acoustic gain parameters for these devices. The use of a remote database enables the present system and method to be configured for a plurality of devices without the necessity to store the parameters for these devices in local memory.

From step 18 or step 20, the mobile station proceeds to step 22 and ends the configuration of the mobile station baseband circuitry.

Figure 2:
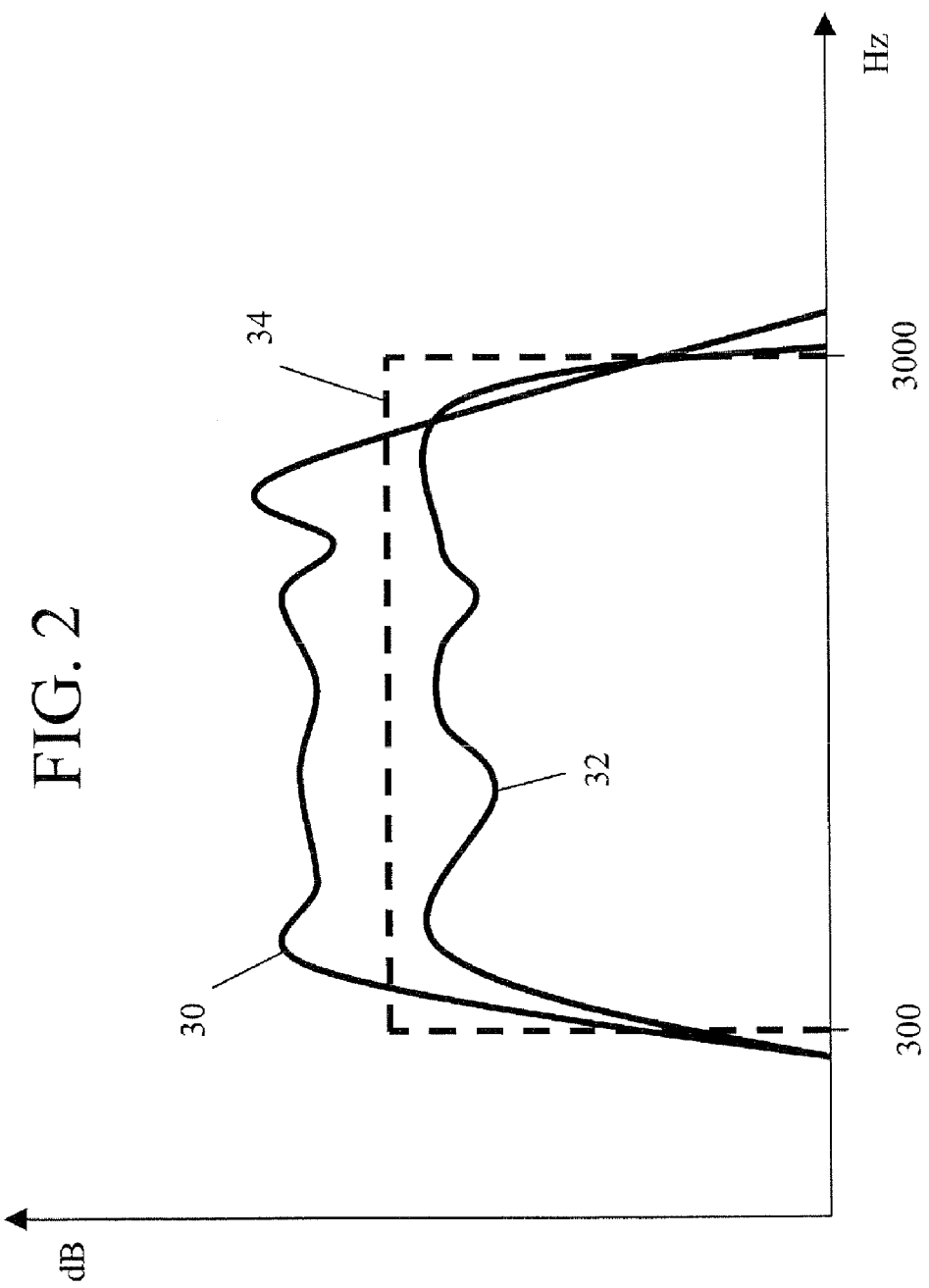
FIG. 2 is a graph of the frequency response characteristics of two sample devices and an ideal frequency response.

Reference is now made to FIG. 2. FIG. 2 shows an example of acoustic response of two different acoustic accessories and an ideal response that could be achieved using the system and method of the present application. Specifically, a first device includes a first frequency response 30 between 300 and 3000 Hz and a second device displays a second frequency response 32 between the same frequencies. These frequencies are included as examples only and the present system and method is not meant to be limited to this frequency range.

The dotted line on FIG. 2 shows the preferred frequency response 34 for all acoustic accessories. By having the same acoustic response 34, the voice quality and audio level will be equivalent for each acoustic accessory and the output frequency response will meet the required certification acoustic mask, regardless of the device being used. This is preferred rather than having to adjust the volume and deal with poor audio quality. DSP filters are well known to those skilled in the art.

In a further alternative embodiment, multiple devices could be used with a single mobile station. Bluetooth provides for the communication between multiple devices, and the baseband circuitry could be reconfigured depending on which device the mobile station is communicating with. If communicating with multiple devices simultaneously, this communication is divided into timeslots for each device, and the mobile station could be reconfigured between each of these timeslots.

Reference is now made to FIG. 3. FIG. 3 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 3, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 4.

Mobile station 102 communicates in and through wireless communication network 104. In the embodiment of FIG. 3, wireless network 104 is a Third Generation (3G) supported network based on Code Division Multiple Access (CDMA) technologies. In particular, wireless network 104 is a CDMA2000 network which includes fixed network components coupled as shown in FIG. 3. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 3, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 3 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Those skilled in art will appreciate that wireless network 104 may be connected to other systems, possibly including other networks, not explicitly shown in FIG. 3. A network will normally be transmitting at very least some sort of paging and system information on an ongoing basis, even if there is no actual packet data exchanged. Although the network consists of many parts, these parts all work together to result in certain behaviours at the wireless link.

Figure 4:
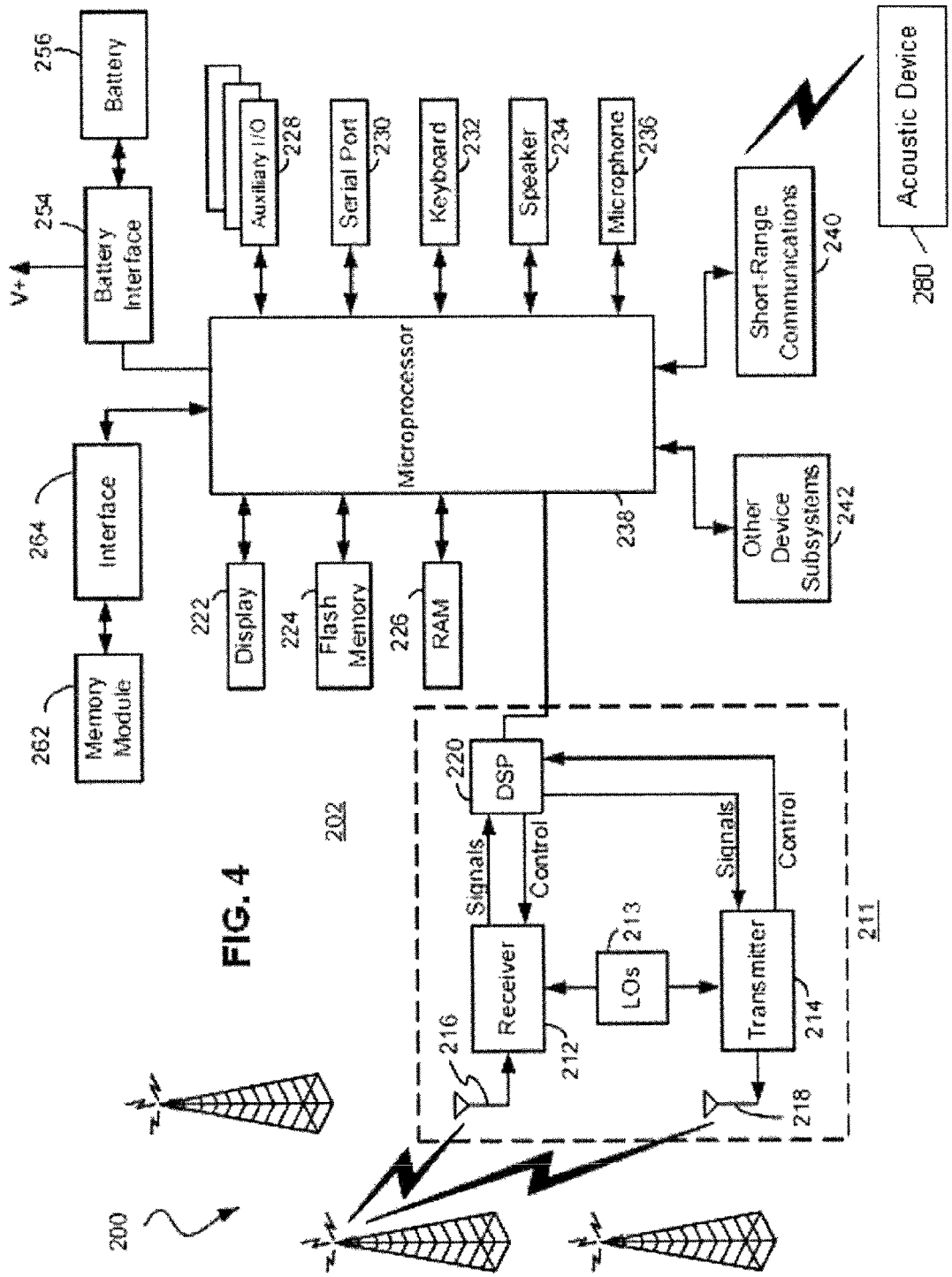
FIG. 4 shows a block diagram of a mobile station upon which the present system and method can be implemented.

FIG. 4 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 3. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 4, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220 or based on a gain parameter derived from a specific auxiliary device, as described below.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 4) which provides power V+ to all of the circuitry.

Mobile station 202 includes a microprocessor 238 (which is one implementation of controller 106 of FIG. 3) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 4 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 4 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 4 is an additional component which provides for communication between mobile station 202 and different systems or devices, which need not necessarily be similar devices. For example, subsystem 240 may communicate with an acoustic device 280 that may include an infrared device and associated circuits and components, or a Bluetooth™ communication module to provide for communication with similarly-enabled systems and devices. Bluetooth™ is a registered trademark of Bluetooth SIG, Inc.

The above-described embodiments are meant to be illustrative of preferred embodiments and are not intended to limit the scope of the present system and method. Also, various modifications, which would be readily apparent to one skilled in the art, are intended to be within the scope of the present system and method. The only limitations to the scope of the present application are set forth in the following claims.

We claim:

1. A method comprising:
    receiving, at a host device, an identifier from each of a plurality of acoustic devices communicating with the host device;
    retrieving a digital signal processor ('DSP') acoustic frequency response and a code-decode ('CODEC') acoustic gain parameter for each of the plurality of acoustic devices from acoustic device characteristics stored on the host device if the host device recognizes the identifiers of each of the plurality of acoustic devices, based on the identifiers;
    for each one of the plurality of acoustic devices, if the acoustic device characteristics of the one acoustic device are not stored on the host device, retrieving the DSP acoustic frequency response and CODEC acoustic gain parameter of the one acoustic device from a remote database based on the identifier of the one acoustic device;
    dividing communications into timeslots for each of the plurality of acoustic devices; and
    configuring an acoustic baseband circuit of the host device at each timeslot with the DSP acoustic frequency response and CODEC acoustic gain parameter of the acoustic device from the plurality of acoustic devices communicating on a current timeslot.

2. The method of claim 1, further comprising configuring the acoustic baseband circuit with a generic DSP acoustic frequency response and a generic CODEC acoustic gain parameter for any acoustic device whose acoustic device characteristics are not retrieved.

3. The method of claim 1, wherein the host device is a device selected from a group consisting of a mobile station, a desktop computer; a stereo system; a video device; and a car kit.

4. The method of claim 1, wherein the plurality of acoustic devices are Bluetooth™ devices.

5. The method of claim 4, wherein the identifiers are model numbers for the Bluetooth™ devices.

6. The method of claim 4, wherein the identifiers are device names for the Bluetooth™ devices.

7. The method of claim 1, wherein the configuring of the acoustic baseband circuit adjusts a frequency response of the acoustic device to a predetermined frequency response.

8. The method of claim 7, wherein the predetermined frequency response ensures equivalent voice quality and audio levels among a plurality of acoustic accessories.

9. A host device communicating with a plurality of acoustic devices, the host device comprising:
    an acoustic baseband circuit;
    a short range communications subsystem;
    a communications subsystem;
    memory; and
    a processor,
    the host device being configured to:
        receive, using the short range communications subsystem, an identifier from each of the plurality of acoustic devices communicating with the host device;
        retrieve a digital signal processor ('DSP') acoustic frequency response and a code-decode ('CODEC') acoustic gain parameter for each of the plurality of acoustic devices from the memory based on the identifiers;
        if the DSP acoustic frequency response and CODEC acoustic gain parameter for the identifier are not found within the memory, utilize the communications subsystem to retrieve the DSP acoustic frequency response and CODEC acoustic gain parameter from a remote database;
        divide communications into timeslots for each of the plurality of acoustic devices; and
        configure the acoustic baseband circuit at each timeslot with the DSP acoustic frequency response and CODEC acoustic gain parameter of the acoustic device from the plurality of acoustic devices communicating on a current timeslot.

10. The host device of claim 9, wherein the host device is further configured to:
    configure the acoustic baseband circuit with a generic DSP acoustic frequency response and a generic CODEC acoustic gain parameter for any acoustic device whose acoustic device characteristics are not retrieved.

11. The host device of claim 9, wherein the host device is a device selected from a group consisting of a mobile station, a desktop computer; a stereo system; a video device; and a car kit.

12. The host device of claim 9, wherein the acoustic devices are Bluetooth™ devices.

13. The host device of claim 12, wherein the identifiers are model numbers or device names for the Bluetooth™ devices.

14. The host device of claim 9, wherein the short range communications subsystem includes a wired connection to an acoustic accessory.

15. The host device of claim 9, wherein the short range communications subsystem utilizes a short range wireless protocol.

16. The host device of claim 9, wherein the configuring of the acoustic baseband circuit adjusts a frequency response of the acoustic device to a predetermined frequency response.

* * * * *